UNITED STATES PATENT OFFICE.

JUDSON A. DE CEW, OF MONTREAL, QUEBEC, CANADA.

PAPER-SIZE AND PROCESS OF MAKING SAME.

1,317,616.     Specification of Letters Patent.     Patented Sept. 30, 1919.

No Drawing.     Application filed May 31, 1917. Serial No. 172,035.

*To all whom it may concern:*

Be it known that I, JUDSON A. DE CEW, a subject of the King of Great Britain, and resident of the city of Montreal, in the Province of Quebec and Dominion of Canada, have invented certain new and useful Improvements in Paper-Size and Processes of Making Same, of which the following is a full, clear, and exact description.

This invention relates to the manufacture of paper size, and particularly to a process or method of stabilizing colloidal solutions of free rosin.

In preparing solutions of rosin soap containing unsaponified rosin held in dilute solution, it has been found that these solutions may be quite stable as far as mill conditions require, yet the physical character of the solutions may be affected materially by the presence of inorganic acids or other impurities in the paper stock, which, combining with the rosin soap, will coagulate or precipitate the rosin which has been held in a colloidal state by the soap solution.

I have discovered a means for protecting these solutions from the action of inorganic impurities by incorporating into the solutions while they are in a cold and diluted condition certain soluble alkaline salts, such as sodium silicate, sodium carbonate or sodium aluminate. The process of incorporation is carried out in such a manner that the alkaline salts will not combine or re-act with the unsaponified rosin in the solution. It is to be noted that there is a physical distinction between unsaponified rosin in solution and unsaponified rosin in emulsion or in suspension. When rosin is dissolved in a soap solution, it is much more reactive chemically than when it is in the form of particles visible to the naked eye, and it is therefore more difficult to hold rosin acids and an alkaline salt in the same solution without combination, than it is to prevent reaction between suspensions of rosin acids and an alkali in solution. This chemical combination is prevented by a condition of extreme dilution and reduced temperatures.

In carrying out my process, I produce solutions carrying a high percentage of unsaponified rosin in solution, the amount of dissolved rosin being over 25%, and generally from 35% to 45% of the total rosin. These solutions are when properly prepared, translucent or opalescent, there being no visible floating particles of rosin. I find at a stage of dilution of 2% total solids that a moderate amount of alkalinity will not effect saponification of the dissolved rosin when the solutions are not heated, the hydrolyzing or separating tendency of the soap at this dilution counteracting the tendency toward saponification. I am therefore able to maintain these materials in a condition having the appearance of perfect solution, yet analysis of which will show over 25% of the total rosin to be unsaponified, while in the presence of approximately 10% of its weight of the alkali. This result is only obtained by first bringing a free rosin soap to a state of high dilution without separation of rosin in the form of emulsion, and then adding thereto the alkaline salt under such conditions of temperature and of concentration as to prevent combination between the alkali and the rosin acids. It is obvious that such solutions as above described cannot be made from a thick rosin soap containing a high percentage of free rosin and of alkaline salts, because when diluting such material by any means which will prevent the separation of the free rosin from solution, saponification would take place with the free alkaline salt.

It is essential that the free rosin dissolved in the rosin soap should not be saponified by contact with alkali, and this can only be prevented by bringing the materials into contact in a cool and highly diluted condition. In carrying out this process in connection with the method of making rosin size solutions described in U. S. patents to Erfurt, Nos. 778,122 and Reissue Patent No. 12,549, I prepare the soap solution by discharging the size into a tank of cold water, which contains, or to which is afterward added, the required amount of the alkaline salt, which is preferably sodium silicate. As the solutions in this tank do not become hot, the free rosin solutions will exist along with the alkaline solutions, and thus the chemical reactions described below can take place.

Let us assume that the size solutions are being used in a special condition where the water in the paper stock contains calcium or magnesium salts in the form of chlorid or carbonate. When these salts come in contact with the size solution, they will first react with the alkaline silicate forming insoluble compounds in the nature of hydrates or silicates. If the soluble calcium salt is a bi-carbonate, then it will be thrown out of solution as a carbonate when coming into contact with the alkali in the solution. The formation of calcium or magnesium resinates is thus largely prevented, and rosin soap containing free rosin may be incorporated in the paper stock and afterward coagulated by means of salts of aluminum, thus producing an effective sizing result. If, through excess of impurities, calcium or magnesium resinates are formed in presence of the alkali, they will be precipitated in a more colloidal condition than if the reaction takes place in a neutral solution. On the other hand, if the size solution is used without the presence of a protective chemical, such as the alkaline silicate, the calcium or magnesium resinates will be thrown down as neutral earth resinates and the sizing effect of the material will be lost. The effect of alkaline silicate in these solutions is not one in which the silicate produces any special sizing effect, but it serves to retard reactions between the rosin in solution and the inorganic impurities which might coagulate the colloidal solution before proper reaction with alumina takes place. I believe that these solutions are different in physico chemical character than solution produced in any other manner, inasmuch as the rosin acids in the solution are in a peculiar physical state, being still in complete solution in the soap although in a high state of dilution, and remain unsaponified, notwithstanding the presence of a definite amount of alkali such as exists in an alkaline silicate. I am thus able to produce and maintain a higher proportion of unsaponified rosin in this physical condition than can be obtained by other means contained in the solution.

Having thus described my invention, what I claim is:—

1. A process of preparing sizing solutions, which consists in diluting a rosin soap containing over 25% of free rosin, and discharging it into a cold solution of an alkaline salt until the total dilution is approximately 2% total solids.

2. A process of making sizing solutions, which consists in diluting a rosin soap containing over 25% of free rosin, and then discharging it into a cold solution of sodium silicate until the total dilution is approximately 2% total solids.

3. A process of making sizing solution, which consists in diluting a rosin soap containing over 25% of free rosin, and discharging it into cold water until the total dilution is approximately 2% total solids, and then adding thereto an alkaline salt.

4. A dilute solution of rosin soap and an alkaline salt holding in colloidal solution over 25% of the rosin.

5. A product consisting of a dilute solution of rosin soap in which is dissolved over 25% of its weight of unsaponified rosin which is stable in the presence of an alkaline salt contained in the solution.

6. A product consisting of a dilute solution of rosin soap, in which is dissolved over 25% of its weight of unsaponified rosin, which is stable in the presence of an alkaline silicate, contained in the solution.

7. The herein described process which comprises treating rosin with an alkali in amount less than that necessary to completely saponify the same, to produce a substantially colloidal solution containing free rosin carried in rosin soap solution, diluting the same, and while at not appreciably above ordinary room temperature, adding a soluble alkaline salt to the diluted liquor.

8. As a new product, a substantially colloidal stable solution containing free rosin, in an alkali metal resinate, and containing in solution with said free rosin a salt having an alkaline reaction.

9. As a new product, a substantially colloidal stable solution containing free rosin, in an alkali metal resinate, and containing in solution with said free rosin an inorganic acid salt of an alkali metal, said salt having an alkaline reaction.

In witness whereof, I have hereunto set my hand.

JUDSON A. DE CEW.